United States Patent
Oran et al.

(10) Patent No.: US 10,742,552 B2
(45) Date of Patent: Aug. 11, 2020

(54) REPRESENTATIONAL STATE TRANSFER OPERATIONS USING INFORMATION CENTRIC NETWORKING

(71) Applicant: Cisco Technology, Inc., San Jose, CA (US)

(72) Inventors: Dave Oran, Cambridge, MA (US); Mark Stapp, Belmont, MA (US); Ilya Moiseenko, Los Angeles, CA (US); Won So, Watertown, MA (US)

(73) Assignee: Cisco Technology, Inc., San Jose, CA (US)

( * ) Notice: Subject to any disclaimer, the term of this patent is extended or adjusted under 35 U.S.C. 154(b) by 459 days.

(21) Appl. No.: 14/633,580

(22) Filed: Feb. 27, 2015

(65) Prior Publication Data
US 2016/0014234 A1      Jan. 14, 2016

Related U.S. Application Data

(60) Provisional application No. 62/023,883, filed on Jul. 13, 2014.

(51) Int. Cl.
*H04L 12/747* (2013.01)
*H04L 29/08* (2006.01)
(Continued)

(52) U.S. Cl.
CPC ........ *H04L 45/742* (2013.01); *G06F 16/9566* (2019.01); *H04L 45/306* (2013.01);
(Continued)

(58) Field of Classification Search
CPC ......... G06F 17/30203; G06F 17/30153; G06F 3/06; H04L 67/2842; H04L 67/1097
See application file for complete search history.

(56) References Cited

U.S. PATENT DOCUMENTS 8,694,675 B2   4/2014   Wang et al.
9,935,963 B2   4/2018   Kantor et al.
(Continued)

FOREIGN PATENT DOCUMENTS

CN    101860550 A    10/2010
CN    102143200 A    8/2011
(Continued)

OTHER PUBLICATIONS

Ambrosin, et al., "Covert Ephemeral Communication in Named Data Networking", arxiv.org, 2013, 13 pages.
(Continued)

*Primary Examiner* — Philip J Chea
*Assistant Examiner* — Mohammed Ahmed
(74) *Attorney, Agent, or Firm* — Behmke Innovation Group LLC; James M. Behmke; James J. Wong

(57) ABSTRACT

In one implementation, a method includes transmitting, to a server, a first interest message. The first interest message includes a request for a representational state transfer (REST) operation and a name of a first state for the REST operation. The method also includes receiving, from the server, a second interest message. The second interest message includes the name of the first state for the REST operation. The method further includes transmitting, to the server, the first state based on the second interest message and receiving, from the server, a response to the REST operation.

25 Claims, 9 Drawing Sheets

(51) Int. Cl.
*G06F 16/955* (2019.01)
*H04L 12/725* (2013.01)
*H04L 29/06* (2006.01)
*H04L 12/927* (2013.01)

(52) U.S. Cl.
CPC .......... *H04L 47/808* (2013.01); *H04L 63/101* (2013.01); *H04L 63/102* (2013.01); *H04L 67/02* (2013.01); *H04L 67/10* (2013.01); *H04L 67/16* (2013.01); *H04L 67/2804* (2013.01); *H04L 67/2842* (2013.01); *H04L 67/327* (2013.01)

(56) References Cited

U.S. PATENT DOCUMENTS

| | | | | |
|---|---|---|---|---|
| 2012/0089781 | A1* | 4/2012 | Ranade | G06F 17/30203 711/118 |
| 2012/0260330 | A1* | 10/2012 | Zlatarev | G06F 21/33 726/10 |
| 2012/0290679 | A1* | 11/2012 | Steinhauer | H04L 69/22 709/217 |
| 2013/0016695 | A1 | 1/2013 | Ravindran et al. | |
| 2013/0227048 | A1 | 8/2013 | Xie et al. | |
| 2013/0242996 | A1 | 9/2013 | Varvello et al. | |
| 2013/0258878 | A1* | 10/2013 | Wakikawa | G08G 1/0112 370/252 |
| 2013/0282860 | A1* | 10/2013 | Zhang | H04L 45/306 709/217 |
| 2014/0164642 | A1* | 6/2014 | Dilmaghani | H04L 45/08 709/238 |
| 2014/0189060 | A1 | 7/2014 | Westphal | |
| 2014/0286199 | A1* | 9/2014 | Li | H04L 65/1016 370/259 |
| 2015/0012539 | A1* | 1/2015 | McHugh | G06F 16/1873 707/737 |
| 2015/0201033 | A1* | 7/2015 | Gupta | H04L 67/2842 709/213 |
| 2015/0269199 | A1* | 9/2015 | McHugh | G06F 12/12 707/638 |
| 2015/0281101 | A1* | 10/2015 | Mosko | H04L 45/7453 370/235 |
| 2015/0334043 | A1* | 11/2015 | Li | H04L 12/6418 709/213 |
| 2016/0014234 | A1* | 1/2016 | Oran | H04L 45/742 709/203 |

FOREIGN PATENT DOCUMENTS

| | | |
|---|---|---|
| CN | 102469041 A | 5/2012 |
| CN | 102970185 A | 3/2013 |
| CN | 103023768 A | 4/2013 |
| CN | 103095710 A | 5/2013 |
| CN | 103399734 A | 11/2013 |
| CN | 103747083 A | 4/2014 |
| CN | 103874157 A | 6/2014 |
| WO | 2007113163 A1 | 10/2007 |
| WO | 2010042733 A1 | 4/2010 |

OTHER PUBLICATIONS

Briante, et al., "eDomus: User-Home Interactions Through Facebook and Named Data Networking", IEEE, 2014, 3 pages.

Li, "Recent Advances in Named Data Caching and Routing", cse.wustl.edu, 2013, 10 pages.

International Search Report and Written Opinion for PCT/US2015/037097 dated Oct. 1, 2015.

Zhou, et al., "REST API Design Patterns for SDN Northbound API", 2014 28th International Conference on Advanced Information Networking and Applications Workshops, IEEE, May 13, 2014, pp. 358-365.

Liu, et al., "Research on the Integration of Silverlight and WebGIS Based on REST", ICMT, IEEE, Oct. 29, 2010, pp. 1-4.

Office Action dated Jul. 1, 2019 in connection with Chinese Application No. 201580037979.2.

Office Action dated Mar. 4, 2019 in connection with Chinese Application No. 201580037991.3.

* cited by examiner

PIT 400A

| Ingress Interface | Name | Reflexive Name | Egress Interface | |
|---|---|---|---|---|
| 1 | /company1/operation1 | /client/state | 4 | } 405 |
| | | | | |
| | | | | |
| | | | | |

*FIG. 4A*

PIT 400B

| Ingress Interface | Name | Reflexive Name | Egress Interface | |
|---|---|---|---|---|
| 1 | /company1/operation1 | /client/state | 4 | } 405 |
| 4 | /client/state | | 1 | } 410 |
| | | | | |
| | | | | |

*FIG. 4B*

PIT 400C

| Ingress Interface | Name | Reflexive Name | Egress Interface | |
|---|---|---|---|---|
| 1 | /company1/operation1 | /client/state | 4 | } 405 |
| | | | | |
| | | | | |
| | | | | |

*FIG. 4C*

PIT 400D

| Ingress Interface | Name | Reflexive Name | Egress Interface |
|---|---|---|---|
| | | | |
| | | | |
| | | | |
| | | | |

*FIG. 4D*

REPRESENTATIONAL STATE TRANSFER OPERATIONS USING INFORMATION CENTRIC NETWORKING

RELATED APPLICATIONS

This application claims the benefit of priority under 35 U.S.C. § 119(e) of U.S. Provisional Application No. 62/023,883, filed on Jul. 13, 2014. All of the aforementioned applications are hereby incorporated by reference in their entireties for all purposes.

FIELD OF THE INVENTION

The present disclosure relates to Information Centric Networking (ICN) system architectures. More specifically, the present disclosure relates methods and systems for representation state transfer (REST) operations in ICN system architectures.

BACKGROUND

Many websites, network services (e.g., web services), network applications (e.g., web applications) use a transactional paradigm known as representational state transfer (REST). A network or system architecture that uses the REST paradigm may be referred to as a REST architecture. Operations and/or transactions that use the REST paradigm may be referred to as REST operations and/or REST transactions.

The REST paradigm may include conditions that computing devices, such as servers and clients, follow when performing operations and/or transactions. One condition may be that the client state may not be stored on the server in between operations. For example, if the server uses the client state to perform a REST operation, the server may delete the client state and/or may transmit the client state back to the client device as part of returning the result of the REST operation. Another condition may be that the client initiates the REST operations. For example, a server may not perform a REST operation unless a request to perform the REST operation is received from a client device. A further condition may be that the request from the client device (to perform the REST operation) includes the information that may be used to perform the REST operation. For example, the request may identify the REST operation and may also indicate how the result of the REST operation should be represented.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 4A through 4D are block diagrams illustrating example pending interest tables (PITs), in accordance with some embodiments.

DESCRIPTION OF EXAMPLE EMBODIMENTS

Figure 1:
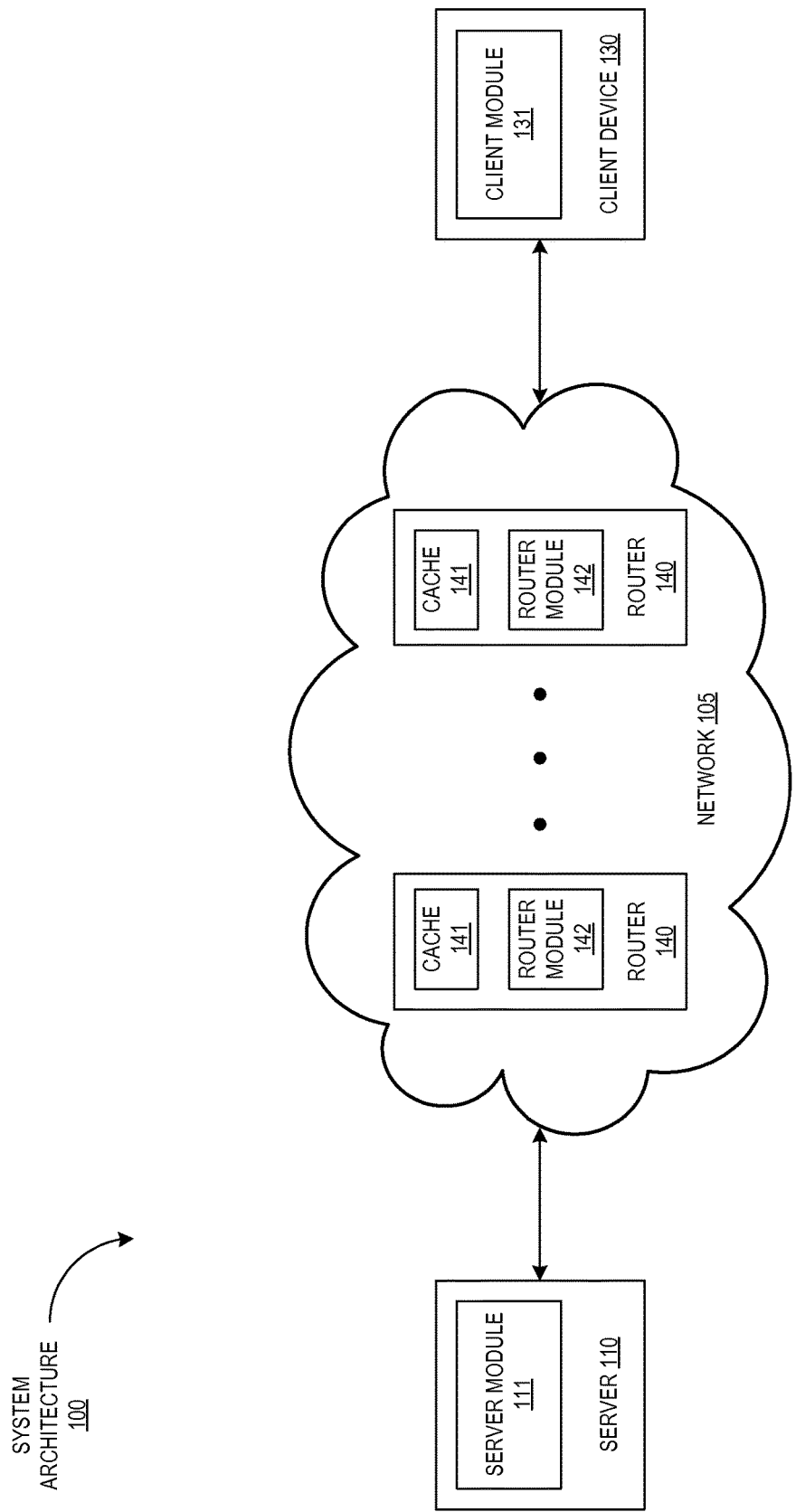
FIG. 1 is a block diagram illustrating a system architecture, in accordance with some embodiments.

Numerous details are described herein in order to provide a thorough understanding of the illustrative implementations shown in the accompanying drawings. However, the accompanying drawings show only some example aspects of the present disclosure and are therefore not to be considered limiting. Those of ordinary skill in the art will appreciate from the present disclosure that other effective aspects and/or variants do not include all of the specific details described herein. Moreover, well-known systems, methods, components, devices and circuits have not been described in exhaustive detail so as not to unnecessarily obscure more pertinent aspects of the implementations described herein.

Overview

Various implementations disclosed herein include apparatuses, systems, and methods for performing REST operations. For example, in some client implementations, a method includes transmitting, to a server, a first interest message. The first interest message includes a request for a representational state transfer (REST) operation and a first name of a first state for the REST operation. The method also includes receiving, from the server, a second interest message. The second interest message includes the first name of the first state for the REST operation. The method further includes transmitting, to the server, the first state based on the second interest message and receiving, from the server, a response to the REST operation.

In other server implementations, a method includes receiving, from a client device, a first interest message. The first interest message includes a request for a representational state transfer (REST) operation and a first name of a first state for the REST operation. The method also includes transmitting, to the client device, a second interest message. The second interest message includes the first name of the first state for the REST operation. The method further includes receiving, from the client device, the first state and transmitting, to the client device, a response to the REST operation.

In further router implementations, a method includes receiving a first interest message on a first network interface of the plurality of network interfaces. The first interest message includes a request for a representational state transfer (REST) operation and a first name of a first state for the REST operation. The method also includes generating a first entry in a pending interest table (PIT). The first entry includes first data indicative of the request and the first name. The method further includes forwarding the first interest message on a second network interface of the plurality of network interfaces.

DETAILED DESCRIPTION

Information Centric Networking (ICN) system architectures are increasing in popularity. Examples of ICN system architectures include the Named Data Networking (NDN) system architecture and the Content-Centric Networking (CCN) system architecture. An ICN system architecture (such as an NDN system architecture) may allow a consumer (e.g., a client device) to request data using interest messages that identify the name of the requested data. A producer (e.g., a producer of the requested data, such as a server computing device) may receive the interest messages and may transmit data objects in response to the interest messages to the consumer. The interest messages and/or data objects are routed and/or forwarded through the ICN system architecture using the names in the interest messages and data objects.

REST operations may be difficult to perform using a general ICN system architecture (e.g., a general NDN architecture or a general CCN architecture). For example, services and/or applications that use the REST paradigm may use a bidirectional data flow between the client device and the server. However, many client devices may not have a routable name that the server may use to communicate with the client devices. In addition, ICN architectures may generally conceal the identity of the client device (e.g., a consumer) from the server (e.g., a producer) which may cause problems for the bidirectional data flow.

In some embodiments, a system architecture may use an NDN system architecture. In the NDN system architecture disclosure herein, interest messages may include a first name and one or more additional names. The one or more additional names may allow a server to request a client state from a client device and may allow for the bidirectional data flow used by a REST operation. The one or more additional names may be non-routable (e.g., may not be globally routable within the NDN system architecture) and may allow the client device to conceal its identity from parties other than the producer/server and the routers on the path between them.

Although the present disclosure may refer to the NDN system architecture, it should be understood that the NDN system architecture is merely an example architecture that may be used. Other embodiments may use other types of system architectures (e.g., CCN, Pursuit, NetInf, etc.) and the examples, implementations, and/or embodiments described herein may be used with the other types of system architectures.

FIG. 1 is a block diagram illustrating a system architecture 100, in accordance with some embodiments. The system architecture includes a server 110, a client device 130, a network 105, and routers 140. The system architecture 100 may be an NDN system architecture. For example, a consumer (e.g., client device 130) in the system architecture 100 may use interest packets to request data and a producer (e.g., server 110) may use may use data objects (e.g., NDN data objects) to transmit the requested data. The server 110 may be referred to as a producer and the client device 130 may be referred to as a consumer or a requestor.

The server 110 may be one or more computing devices (such as a rack-mount server, a router computer, a server computer, a personal computer, a mainframe computer, a smartphone, a personal digital assistant (PDA), a laptop computer, a tablet computer, a desktop computer, etc.). The client device 130 may also be a computing device (e.g., a personal computer, a smartphone, a personal digital assistant (PDA), a laptop computer, a tablet computer, a desktop computer, etc.). The network 105 may include one or more of a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In one embodiment, the system architecture 100 may be a REST architecture. As discussed above, a REST architecture may be a system architecture where one or more of the following conditions are satisfied: 1) a client device (e.g., client device 130) may initiate operations to servers; 2) client state or context may not be stored on the server between requests; and/or 3) client requests/messages include state or context information used to execute the operation. The operations performed by the server module 111 (and requested by the client device 130) may be REST operations. As discussed above, a REST operation may be an operation that satisfies the above-conditions. A REST operation may also be referred to as a REST transaction, a RESTful operation, and/or a RESTful transaction.

The server 110 includes a server module 111. In one embodiment, the server module 111 may be an application, a service, a daemon, a process, a component, etc., that may perform REST operations for client devices. For example, the server module 111 may be part of a banking system that allows user to manage bank accounts, deposit money, withdraw money, transfer money, pay bills, etc. The server module 111 may receive requests to perform REST operations (e.g., withdraw money) from the client device 130 (e.g., from the client module 131) and the server module 111 may perform the requested REST operations.

In one embodiment, the server module 111 may be reachable using a name for the server module 111. For example, the server module 111 may be reachable using a first interest message that includes a first name of the server module 111 (e.g., "/bank_name/online_banking/"). The first name (used to reach the server module 111) may also include data/information that may indicate and/or identify the operation that is requested by a client device (e.g., client device 130). For example, the first name in the interest message may be "/bank_name/online_banking/deposit" and a portion of the first name (of the interest message) may include the value "deposit" to indicate and/or identify the REST operation (e.g., depositing money into an account) requested by a client device. The server module 111 may receive a first interest message (e.g., an interest packet) from the client device 130 to request the server module 111 to perform a REST operation. The first interest message may include a second name or may include a plurality of additional names (as discussed in more detail below). The second name may be the name of the client state that the client device 130 may provide to the server module 111. The server module 111 may transmit a second interest message (or multiple interest messages) to the client device 130 (using the second name or the plurality of additional names) to request the client state and the client device 130 may transmit the client state to the server 110 (e.g., may transmit one or more data objects such as NDN data objects or CCN data objects). The server module 111 may use the client state to perform the REST operation requested in the first interest message and may transmit a response (e.g., a result of the REST operation) to the client device 130. The client state may also be referred to as application state.

In one embodiment, the server module 111 may transmit the client state to the client device 130. For example, when the client device 130 first interacts (e.g., communicates) with the server 110, the client device 130 may request an initial client state (to use in subsequent REST operations) from the server 110 (as discussed in more detail below). In another example, after the server module 111 performs a REST operation (requested by the client device 130), the client state may be changed and/or updated. The server module 111 may transmit the updated client state to the client device 130. In one embodiment, the server module 111 may sign and/or encrypt data objects (e.g., NDN data objects, CCN data objects, etc.) that include the client state before transmitting the data objects to the client device 130.

The client device 130 includes a client module 131. In one embodiment, the client module 131 may be application, service, daemon, process, component, etc., that may request the server 110 (e.g., the server module 111) to perform one or more REST operations (e.g., request one or more REST operations from the server 110). For example, the client module 131 may be a web browser that allows a user to request a web operation (e.g., a REST operation). In another example, the client module may be an application (e.g., an online banking app) that allows the user to request a REST operation. The client module 121 may transmit the first interest message (to request a REST operation) to the server module 111. As discussed above, the first interest message may include the name of the server module 111 and/or may indicate/identify the REST operation. The first interest message may also include one or more additional names (as discussed in more detail below). The name of the server module 111 and/or the REST operations may be known a priori by the client module 121. For example, the client module 121 may access a database, a table, etc., that may include the name of the server module 111. The client module 121 may receive the second interest message from the server 110 and may transmit the client state (that may be used to perform the REST operation) to the server 110 based on (e.g., in response to) the second interest message. The client module 121 may also receive an updated client state if the client state was updated (e.g., modified or changed as a result of the REST operation).

The system architecture 100 also includes routers 140. Routers 140 may be communication devices (e.g., computing devices such as routers, switches, etc.) that may route and/or forward data between the server 110 and the client device 130. For example, router 140 may receive the first interest message from the client device 130 and may forward the first interest message to the server 110. The server 110 may transmit the client state to the client device 130 via the routers 140. Each router 140 may include a cache 141. As discussed above, the system architecture 100 may be an NDN system architecture. The NDN system architecture may allow the routers 140 to store (e.g., cache) NDN data objects (e.g., client states, responses, etc.) in their respective caches 141. When a router 140 receives a request (e.g., an interest packet) for an NDN data object from the client device 130 and the router 140 has the NDN data object stored in its cache 141, the router 140 may transmit the NDN data object toward the client device 130 in response to the request instead of forwarding the request to the server 110. This may improve latency and may reduce the amount of network congestion in the network 105. In one embodiment, the caches 141 may also allow multi-path and multi-destination routing without using domain name system (DNS) lookups, load balancers, and proxies.

Each router 140 includes a router module 142. In one embodiment, the router module 142 may be application, service, daemon, process, component, etc., which may forward interest messages and/or data objects through the network 105. The router module 142 may forward the interest messages, client states, and/or responses between the client device 130 and the server 110. The router module 142 may determine whether an interest message or a data object (e.g., a client state, a response) has a routable name. In one embodiment the router module 142 may use a forwarding information base (FIB) to route interest messages and/or data objects that have routable names (as discussed in more detail below). In another embodiment, the router module 142 may use a pending interest table (PIT) to route interest messages and/or data objects that have non-routable names (as discussed in more detail below).

In one embodiment, the system architecture 100 may allow the server 110 to perform REST operations for the client device 130. The second name (and/or additional names) in an interest message may allow the server 110 to request a client state (that may be used in a REST operation) from the client device 130. By sending an interest message that includes the second name, the server 110 may be able to achieve the bidirectional data flow to perform the REST operation. As discussed above, the client device 130 may not have a routable name and the second name may allow the server 110 to request state information from the client device 130 without a routable name for the client device 130.

Although FIG. 1 may refer to the NDN system architecture, it should be understood that the NDN system architecture is merely an example architecture that may be used. Other embodiments, may use other types of system architectures (e.g., CCN, Pursuit, NetInf, etc.).

Figure 2:
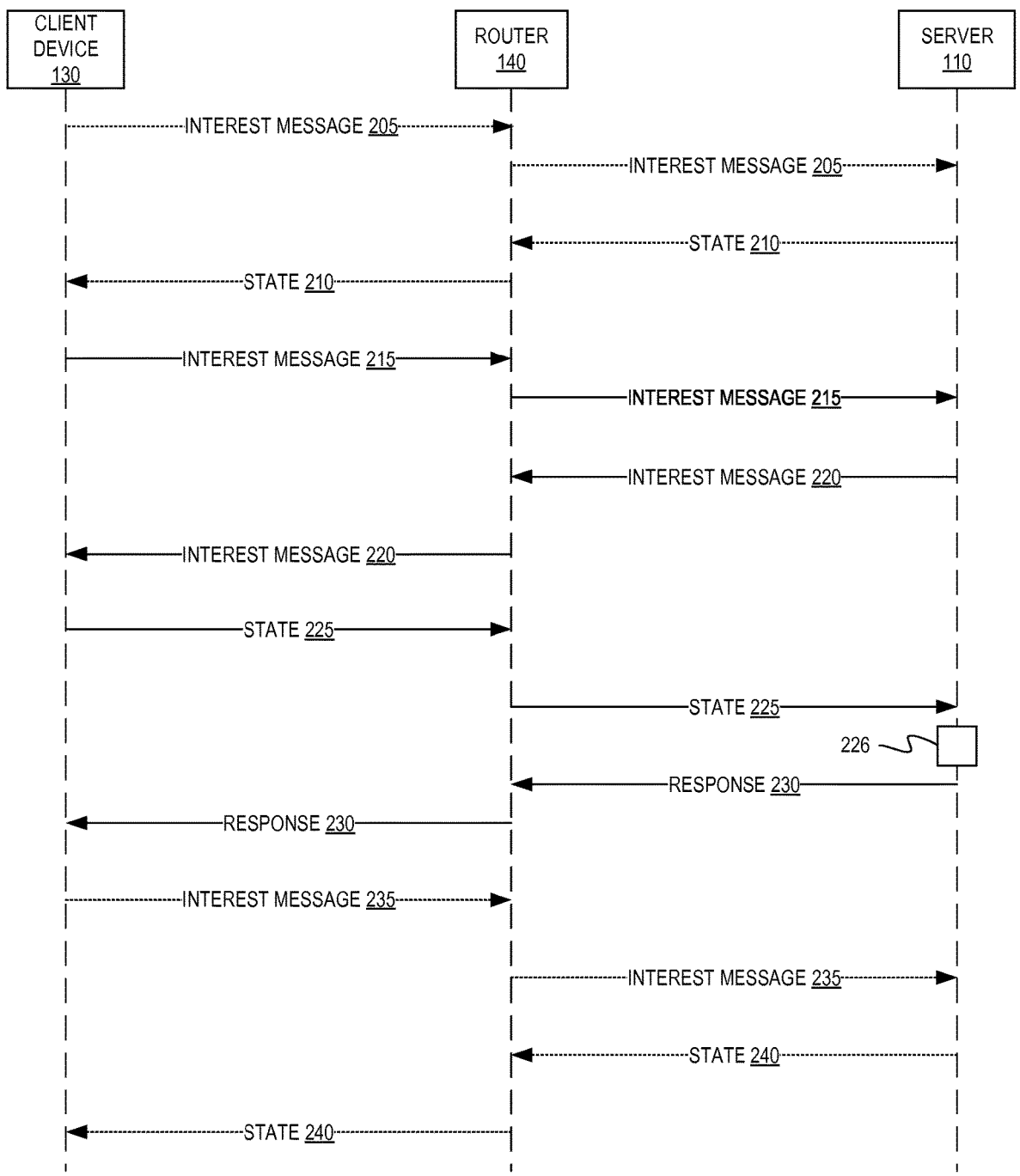
FIG. 2 is a sequence diagram illustrating an example process for performing a REST operation, in accordance with some embodiments.

FIG. 2 is a sequence diagram 200 illustrating an example process for performing a REST operation, in accordance with some embodiments. As discussed above in conjunction with FIG. 1, the client device 130 may want to request the server 110 to perform a REST operation. For example, the client device 130 may want to withdraw money from a user's account.

As illustrated in FIG. 2, the client device 130 may transmit an interest message 205 to request an initial client state from the server 110. For example, prior to requesting one or more REST operations, the client device 130 may request the initial client state that may be used for subsequent REST interactions with the server 110 by transmitting the interest message 205. The interest message 205 may include a name that identifies the server module and the initial client state. The name of the server module may allow the router 140 to forward (e.g., route) the interest message 205 to the server 110 (e.g., to the server module of the server 110). In one embodiment, the name for the server module and the initial client state may be known a priori by the server 110 and/or the client device 130. For example, the name (for the server module and client state) in the interest message may follow a pre-defined naming convention known to the client module and/or server module. In another embodiment, the name for the initial client state may include information that may identify and/or indicate one or more of the client device 130, a client module (e.g., client module 131 illustrated in FIG. 1) and a user of the client device. For example, a portion of the name for the initial client state may include a user's login name, a name/identifier for the client device 130, etc. This may allow the server 110 to provide an initial client state that is specific to the client device 130, the client module, and/or the user of the client device 130. In a further embodiment, the interest message 205 may include a separate payload and/or an additional field that may be used to identify the client state (e.g., the interest message 205 may include a name of the server module and a separate field that identifies the initial client state).

The interest message 205 may be received by the router 140 (e.g., received at a first network interface or first network port) and the router 140 may forward the message to the server 110 (e.g., may forward the message using a second network interface or second network port). Although one router 140 is illustrated in FIG. 2, there may be multiple routers between the server 110 and the client device 130 in other embodiments. Each router between the server 110 and the client device 130 may forward interest messages and/or data objects to the next router along the path. The server 110 may receive the interest message 205 and may generate the initial state (e.g., the initial client state). The server 110 may transmit the initial state 210 to the client device 130 via the router 140. In one embodiment, the server 110 may delete the initial state after transmitting the initial state 210 to the client device 130. The initial state 210 may satisfy the interest message 205. As discussed above, the initial state 210 may be signed using a private key of the server 110. The initial state may also be encrypted using a key (e.g., a shared secret key) that is known to both the client device 130 and the server 110. The initial state may also be encrypted using a public key of the client device 130. This allows the server 110 to prevent unauthorized access to the initial state 210 and allows the client device 130 to verify that the initial state 210 is from the server 110. In one embodiment, the interest message 205 and the initial state 210 may be optional. For example, the client device 130 may have previously received the initial state 210 from the server 110 and the client device 130 may not transmit the interest message 205 to request the initial state 210.

After (optionally) receiving the initial state 210, the client device 130 may transmit interest message 215. The interest message 215 may be received by the router 140 (e.g., received at a first network interface or first network port) and the router 140 may forward the message to the server 110 (e.g., may forward the message using a second network interface or second network port). The interest message 215 may include a first name of a server module of the server 110 (e.g., the name of the server module 111). The first name may also indicate the REST operation requested by the client device 130 or the REST operation may be identified using a payload/data field in the interest message 215. The name of the server module may allow the router 140 to forward (e.g., route) the interest message 215 to the server 110 (e.g., to the server module of the server 110). As discussed above, the name of the server module may be previously known to the client device 130.

In one embodiment, the interest message 215 may also include a second name (e.g., a second, separate name) The second name may be the name of the state 225 that the client device 130 is willing to provide to the server 110. As discussed above, the server 110 may not store the client state in a REST architecture. Thus, the client device 130 may provide the client state to the server 110 so that the server 110 may perform a requested REST transaction. Including the second name (e.g., the name of the state 225) in the interest message 215 may allow the client device 130 to provide the name of the state 225 (e.g., the second name) to the server 110 so that the server 110 is able to request the state 225 from the client device 130 (e.g., so that the server 110 is able to transmit interest message 220) if the server 110 determines that the state 225 will be used to perform the requested REST operation. If the server 110 determines that the state 225 will not be used to perform the requested REST operation, the server 110 may ignore the second name (e.g., may not transmit the interest message 220 as discussed below) and the client device 130 may not transmit the state 225. This may allow the client device 130 to refrain from providing unnecessary data (e.g., the state 225) to the server 110. The second name may be referred to as a reflexive name or a data object locator.

In one embodiment, the client state of the client device 130 may be too large to be transmitted in a single data object (e.g., in an NDN data object or a CCN data object). The client state may be divided (e.g., split, segmented) into multiple pieces, segments, or chunks. For example, the client state may be divided across multiple NDN data objects or multiple CCN data objects. The interest message 215 may include a plurality of names in addition to the first name to allow the server 110 to request the multiple data objects (e.g., to allow the server 110 to transmit multiple interest messages for the client state). For example, each of the multiple data objects may have a name and the names of the multiple data objects may be included in the interest message 215. The interest message 215 may include the first name, and the plurality of names. Each name in the plurality of names may be associated with one of the multiple data objects. The number of names in the plurality of names may be based on the size of the client state and/or the size of the data objects (e.g., the size of the payload of the data objects). In a further example, the server 110 router 140, and the client device 130 may use a common scheme or convention for dividing the client state across multiple data objects. This may allow the names of each portion (e.g., each piece, segment, chunk, etc.) of the client state to be inferred. For example, the scheme/convention may divide a state into three data objects and may name each data object as follows: STATE-NAME_Part-X, where the "X" may be the value 1, 2, or 3. This may allow the server 110, router 140, and/or the client device 130 to infer that the second portion of the state may be named STATE-NAME_Part-2.

In one embodiment, the second name may be a non-routable name. A non-routable name may be a name that is not globally known and/or recognized in an NDN network architecture. A non-routable name may also be a name where a prefix/portion of the name does not exist in the forwarding information base (FIB) of the router 140. For example, a non-routable name may be a name where no prefix/portion of the name exists in the FIB of the router 140. When the second name is a non-routable name, the router 140 may not use the FIB to determine how and/or where to forward (e.g., route) an interest message. The router 140 may use a pending interest table (PIT) to forward an interest message that includes the second name and to forward data objects that satisfy the interest message that includes the second name. The PIT and FIB are discussed in more detail below in conjunction with FIGS. 4A through 4D.

In one embodiment, the interest message 220 may be identified as an interest message that is addressed to a non-routable name (e.g., an interest message that is requesting data with a non-routable name). An interest message that is addressed to a non-routable name may be referred to as a reflexive interest message. The reflexive interest message may include a flag, field, identifiers, etc., indicating that the interest message is addressed to a non-routable name. In another example, the non-routable name of the reflexive interest message may include an identifier, a keyword, a value, a namespace, etc., which indicates that the name is non-routable. Identifying the interest message 220 as an interest message that is addressed to a non-routable name (e.g., a reflexive interest message) may allow the router 140 to determine whether the FIB or the PIT should be used to forward (e.g., route) the interest message 220 and the state 225. For example, an interest message addressed to a routable name may be forwarded using the FIB and an interest message addressed to a non-routable name (e.g., a reflexive interest message) may be forwarded using the PIT (as discussed in more detail below).

When the server 110 receives the interest message 215, the server 110 may transmit interest message 220 to request the state 225. The router 150 may receive the interest message 220 and may forward (e.g., route) the interest message 220 to the client device 130. The client device 130 may transmit the state 225 based on (e.g., in response to) the interest message 220. For example, the client device 130 may transmit an NDN data object or a CCN data object that includes the state 225. The state 225 may be signed using a private key of the client and/or may be encrypted using a key shared between the client device 130 and the server 110. The state 225 may also be encrypted using a public key of the server 110. The router 150 may receive the state 225 and may forward (e.g., route) the state 225 to the server 110. In one embodiment, the server may not transmit the interest message 220. For example, the server 110 may not need the state 225 to perform the REST operation requested in the interest message 215. If the server 110 does not need the state 225 to perform the REST operation requested in the interest message 215, the server 110 may not transmit the interest message 220 and may not receive the state 225. In one embodiment, the state 225 may be the same as the initial state 210. The state 225 may be referred to as a reflexive data object because the state 225 may be a data object with a non-routable name.

When the server 110 receives the state 225, the server 110 may perform the REST operation (e.g., deposit money into a bank account) requested in the interest message 215 (e.g., the REST operation indicated in the interest message 215) at block 226. The server 110 may transmit the response 230 after performing the REST operation. In one embodiment, the response 230 may include a result of the REST operation. For example, the response 230 may indicate whether the REST operation was completed successfully, failed, or was partially completed. In another example, the response 230 may also indicate a reason why the REST operation failed and/or was partially completed. In one embodiment, the response 230 may be wrapped in an NDN data object that has a name which is the same as the first name of the interest message 215. For example, the response 230 may be included in and/or may be part of an NDN data object. In another embodiment, the response 230 may be wrapped in a CCN data object. For example, the response 230 may be included in and/or may be part of a CCN data object. The response 230 may satisfy the interest message 215.

In one embodiment the response 230 may also indicate whether the state 225 has been modified (e.g., updated and/or changed) as a result of the REST operation. For example, the response 230 may indicate that an updated client state (e.g., an updated account balance) is available after performing the REST operation (e.g., after withdrawing money from a user's account). If the response 230 indicates that an updated state is available (e.g., indicates that the state 225 has been modified), the client device 130 may transmit interest message 235. The interest message 235 may include a name for the updated state. The router 140 may receive the interest message 235 and may forward (e.g., route) the interest message 235 to the server 110. The server 110 may transmit the state 240 (e.g., the updated state) and the router 140 may forward the state 240 (e.g., the updated state) to the client device 130.

In one embodiment, the state 240 (e.g., the updated state) may be signed by the server 110. For example, the server 110 may sign the state 240 in order to allow a computing device (e.g., the server 110, the client device 130, etc.) to verify that the state 240 was provided by the server 110. This may also allow the server 110 to verify that the state 240 has not been modified when the client 130 uses the updated state 240 (e.g., provides the updated state 240 to the server 110) for subsequent REST operations. In another embodiment, the server 110 may encrypt the state 240 to help prevent unauthorized access to the state 240. For example, the server 110 may encrypt the state 240 using a key (e.g., a private key of the server 110, a public key of the client 130, a key known to both the server 110 and the client 130, etc.). In a further embodiment, the state 240 may be signed and encrypted by the server 110.

In one embodiment, the system architecture (e.g., NDN, CCN, Pursuit, NetInf, etc.) may allow multiple data objects in response to an interest message. For example, multiple data objects may be used to satisfy an interest message. This may allow the server 110 to return the state 240 (e.g., the updated state) together with the response 230. Thus, the client device 130 may not need to transmit interest message 235 to get the state 240 from the server 110.

As discussed above, the interest message 220 may be an interest message that requests (e.g., specifies and/or identifies) a data object with a non-routable name (e.g., interest message 220 may be a reflexive interest message). In one embodiment, the interest message 220 and state 225 (that satisfies the interest message 220) may not be independent of the interest message 215 and the response 230 (that satisfies the interest message 215). For example, the interest messages 215 and 220 may be associated with a timeout value or period (e.g., a period of validity, a lifetime, etc.) by the router. The timeout values may indicate how long the router 140 should wait for data objects that satisfy the interest message 215 and interest message 220. For example, an interest message with a timeout value of fifteen seconds may indicate to the router 140 that the router 140 should wait fifteen seconds for a data object that satisfies the interest message. After fifteen seconds, the interest message may expire and the router 140 may remove the name of the data object from the PIT.

In one embodiment, the timeout value associated with the interest message 220 may be less than or equal to the timeout value associated with the interest message 215. The timeout value of the interest message 215 may indicate how long the router should wait for the response 230 and the response 230 may include the result of the REST operation requested in the interest message 215. Because the state 225 may be used to perform the REST operation, it may not be appropriate to return the state 225 after the interest message 215 has expired (e.g., after the timeout value or period has passed). In addition, the state 225 (e.g., a reflexive data object) may be forwarded (e.g., routed) using the PIT of the router 140 because the state 225 has a non-routable name. The router 140 (and any other routers between the server 110 and the client device 130) may forward the state 225 along the reverse path of the interest message 220 using the PIT. The timeout periods of the interest messages 215 and 220 may allow the PIT entries for the interest messages 215 and 220 to be removed from the PIT after the timeout periods have expired.

In another embodiment, the client device 130 may use other messages, functions, and/or operations to provide the server with the state 225. For example, the client device 130 may not use the second name (e.g., a reflexive name/data locator) in the interest message 215. The client device 130 may transmit a different type of interest message 205 that includes a payload to the server 110. The client device 130 may include the state 225 in the payload of the interest message 215. The server 110 may receive the state 225 without transmitting interest message 220 because the state 225 may be part of the interest message 215 received from the client device 130.

Figure 3A:
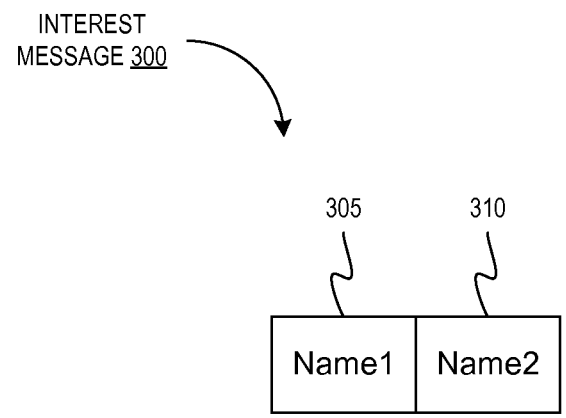
FIG. 3A is a block diagram illustrating an example interest message, in accordance with some embodiments.

FIG. 3A is a block diagram illustrating an example interest message 300, in accordance with some embodiments. The interest message 300 may be an example of interest message 215 illustrated in FIG. 2. The interest message 300 includes a name 305 (e.g., "Name1") and a name 310 (e.g., "Name2"). As discussed above, a client device may transmit an interest message 300 to request a REST operation from a server (e.g., to request the server to perform the REST operation). The name 305 may include the name of a server/server module and/or may identify the REST operation requested by the client device (as discussed above). The name 310 may be the name for the client state that the client device is willing to provide to the server (as discussed above). For example, the server may use the client state to perform the REST operation and the client device may be willing to provide the state to the server if the server requests the client state. As discussed above, the name 310 (e.g., the second name or the reflexive name) allows the server to request the client state from the client device. Also as discussed above, the second name may be a non-routable name or a reflexive name (e.g., a name that is not globally known and/or recognized in an NDN network architecture or where a prefix/portion of the name does not exist in the FIB).

In an NDN system architecture (or other ICN system architectures such as CCN), the router may aggregate interest messages with matching names received from different network interfaces (e.g., different ports). When a router aggregates interest messages, the router may not create a separate entry in the PIT when an interest message with a name that matches an entry in the PIT is received. Instead, the router may update the matching entry to indicate which network interface the interest message was received from. In one embodiment, the router may aggregate interest messages that include matching (e.g., identical) names and reflexive names. For example, the router may aggregate interest messages that include the name "Name1" and the reflexive name "Name2." In one embodiment, the client device may not want the interest messages to be aggregated. The client device may add a value, portion, etc., to the reflexive name to make the reflexive name more unique. For example, the client device may include a random value (e.g., random number, random alphanumeric value, etc.) in the reflexive name. In another example, the client device may include a hash of the object named by the reflexive name (e.g., a hash value generated by applying a hash function, such as SHA-1, to the object named by the reflexive name).

Figure 3B:
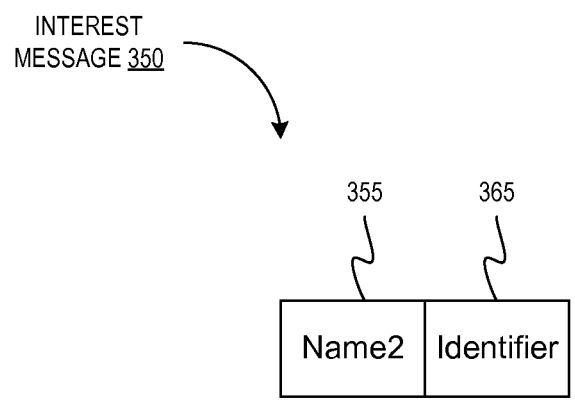
FIG. 3B is a block diagram illustrating an example interest message, in accordance with some embodiments.

FIG. 3B is a block diagram illustrating an example interest message 350, in accordance with some embodiments. The interest message 350 may be an example of interest message 220 illustrated in FIG. 2. The interest message 350 includes a name 355 (e.g., "Name2") and an optional identifier 365. The name 355 may be a non-routable name (e.g., may be a reflexive name). The name 355 may be provided to the server by the client device via a previous interest message (e.g., via interest message 300 illustrated in FIG. 3A). The name 355 may allow the server to request the client state from the client device.

As discussed above, a server may transmit the interest message 350 to a client device to request a client state from the client device. In one embodiment, the interest message 350 may be identified as an interest message that is addressed to a non-routable name (e.g., may be identified as a reflexive interest message) based on the identifier 365. For example, the identifier 365 may be a header, a flag, field, a value, etc., that indicates that the interest message 350 is a reflexive interest message (e.g., that indicates that the interest message 350 is addressed to a non-routable name). In another embodiment, the interest message 350 may be identified as a reflexive interest message based on the name 355. For example, the name 355 may include an identifier, a value, and/or a namespace which indicates that the name is non-routable (e.g., the name 355 may include the value "reflexive"). Identifying the interest message 350 as a reflexive interest message may allow the router 140 to determine whether the FIB or the PIT should be used to forward (e.g., route) the interest message 350 and data object that satisfies the interest message 350 (as discussed in more detail below).

FIGS. 4A through 4D are block diagrams illustrating example pending interest tables (PITs) 400A through 400D, in accordance with some embodiments. As discussed above, a router (e.g., router 140 illustrated in Figure) may include multiple network interfaces (e.g., multiple network ports and/or network connections). The router may receive interest messages (e.g., NDN interest messages, CCN interest messages, etc.) and may forward/route interest messages between computing devices (e.g., between a client device and a server). For example, the router may receive an interest message at a first network interface (e.g., a first port) and may forward/route the interest message using a second network interface (e.g., a second port). The router may also receive data objects in response to the interest messages and may forward/route data objects (e.g., NDN data objects, CCN data objects) between computing devices. For example, the router may receive a data object at the second network interface and may forward/route the data object using the first network interface.

The router may include a forwarding information base (FIB). The FIB (not shown in the figures) may be populated by a name-based routing protocol. The FIB may indicate which network interface of the router should be used to forward/route an interest message based on prefixes and/or portions of the name in the interest message. For example, an interest message may include the name "/company1/video/video1." The FIB may indicate that interest messages with a prefix of "/company1" should be forwarded/routed to the first network interface (e.g., transmitted through the first network interface). The router may also be statically configured to route different prefixes and/or portions of names to different network interfaces. The router may also include a PIT. The PIT may store a list of the interest messages that are waiting for returning data objects (e.g., a list of interest messages that have not been satisfied).

As illustrated in FIG. 4A, the PIT 400A includes entry 405. The entry 405 may indicate that a first interest message with a first name "/company1/operation1" was received from the first network interface of the router (e.g., ingress interface "1"). The entry 405 may also indicate that the first interest message includes a second name (e.g., a reflexive name or a non-routable name) "/client/state." The entry 405 may also indicate that the first interest message was forwarded (e.g., routed) to the fourth network interface of the router (e.g., egress interface "4"). Referring back to FIG. 2, the entry 405 may be created after interest message 215 is received by the router. The router may use the FIB to determine which network interface should be used to forward/route the interest message 215. The router may also create an index (or other data structure such as a hash data structure, a trie data structure, etc.) that allows the router to access entries in the PIT based on the second name (e.g., based on the reflexive name or non-routable name).

As illustrated in FIG. 4B, the PIT 400B includes entry 405 and entry 410. The entry 410 may indicate that a second interest message with the name "/client/state" was received from the fourth network interface of the router. Referring back to FIG. 2, the entry 410 may be created after interest message 220 is received by the router. As discussed above in conjunction with FIG. 4A, the first interest message (corresponding to entry 405) may include a second name (e.g., a reflexive name or a data object locator). The name in the second interest message and in the entry 410 may be the second name of the first interest message. In one embodiment, the router may determine whether the second interest message is addressed to a non-routable name (e.g., whether the second interest message is a reflexive interest message that is requesting a data object that has a non-routable name). For example, the router may determine whether the second interest message has an identifier, field, header, etc., indicating that the second interest message is a reflexive interest message. In another example, the router may analyze the name in the second interest message to determine whether the name includes a value, keyword, namespace, etc., which indicates that the name is a non-routable name. As discussed above, the name "/client/state" in the second interest message may be a non-routable name (e.g., may be a reflexive name).

In one embodiment, when the second name is a non-routable name, the router may analyze the PIT 400B to identify an entry that includes the non-routable name. For example, the router may analyze the PIT 400B and may determine that entry 405 includes the non-routable name "/client/state". The router may determine whether the second interest message arrived on one of the egress interfaces in the entry 405 (e.g., whether the second interest message arrived on egress interface "4"). If the second interest message did not arrive on one of the egress interfaces in the entry 405, the second interest message may be dropped (e.g., the router may not forward the second interest message). If the second message did arrive on one of the egress interfaces in the entry 405 the router may analyze a cache to determine whether the data object named in the second interest message (e.g., the reflexive data object) is present in the cache (e.g., is stored in the cache). In one embodiment, if the data object is present in the cache, the router may forward the data object named in the second interest message through the egress interface (on which the second interested message arrived). In one embodiment, if the data object is not present in the cache, the router may use the PIT 400B to identify a set of ingress interfaces (e.g., ingress interface "1") and may forward the second interest message to one of the ingress interfaces. The router may also create the entry 410 to indicate that the second interest message has been forwarded to one of the ingress interfaces. In one embodiment, the router may not use the FIB when determining how and/or where to forward a reflexive interest message.

As discussed above, the each interest message may be associated with a timeout period (e.g., period of validity, a lifetime, etc.). The timeout period may indicate how long a router may wait for a data object that satisfies an interest message (e.g., how long the router will wait for the data object named in the interest message). In one embodiment, the router may set the timeout period of the second interest message to be less than or equal to the timeout period of the first interest message. The router may store the timeout periods for the interest messages in the PIT (not shown in the figures). For example, each entry in the PIT 400C may include a timeout value or field to indicate the timeout period for the interest message for an entry.

As discussed above, the server 110 may transmit multiple reflexive interest messages to request the client state from the client device if the client state is too large to be transmitted in a single data object. In one embodiment, the PIT for the router may include an entry for each of the multiple reflexive interest messages (not shown in the figures). As each reflexive data object is received by the router, the router may route the reflexive data object using the PIT and may remove the PIT entry for corresponding reflexive interest from the PIT. For example, as each portion, chunk, segment, piece, etc., of the client state is received, the router may route the portion, chunk, segment, piece, etc. In another embodiment, the PIT for the router may include one entry that may be used for the multiple reflexive data objects. For example, the rules for matching a name for a data object to a name in the PIT may be relaxed such that chunk numbers in the name for a data object may be ignored when matching names (e.g., the chunk numbers or other identifiers indicating that a data object includes a portion of a client state are not used to search for an entry in the PIT). In another example, the number of portions, chunks, segments, pieces, etc., may be included in the first interest message (e.g., included as a separate field in the first interest message or as part of the second name). The number of portions may allow the router to match names with chunk numbers (or other identifiers) with an entry in the PIT.

As illustrated in FIG. 4C, the PIT 400C includes entry 405. The PIT 400C may result from removing entry 410 from the PIT 400B. For example, referring back to FIG. 2, the client device may transmit the state 225 to the server. The router may receive the state 225 and may access entry 410. The router may determine that the second interest message requesting the state 225 was received from the fourth network interface of the router and may route or forward the state 225 using the first network interface of the router. The router may remove the entry 410 after routing or forwarding the state 225 (as illustrated in FIG. 4C). The router may optionally store the state 225 in a cache (or some other memory) of the router.

As illustrated in FIG. 4D, the PIT 400D does not include entries. The PIT 400D may result from removing entry 405 from the PIT 400C. For example, referring back to FIG. 2, the server may transmit the response 230 to the client device after performing the REST operation requested in the first interest message (represented by entry 410 in FIGS. 4A through 4C). The router may receive the response 230. The router may access entry 405 to determine that the interest message requesting the response 230 was received from the first network interface of the router and may route or forward the response 230 using the first network interface of the router. The router may remove the entry 405 after routing or forwarding the response 230 (as illustrated in FIG. 4D). The router may optionally store the response 230 in a cache (or some other memory) of the router.

Figure 5:
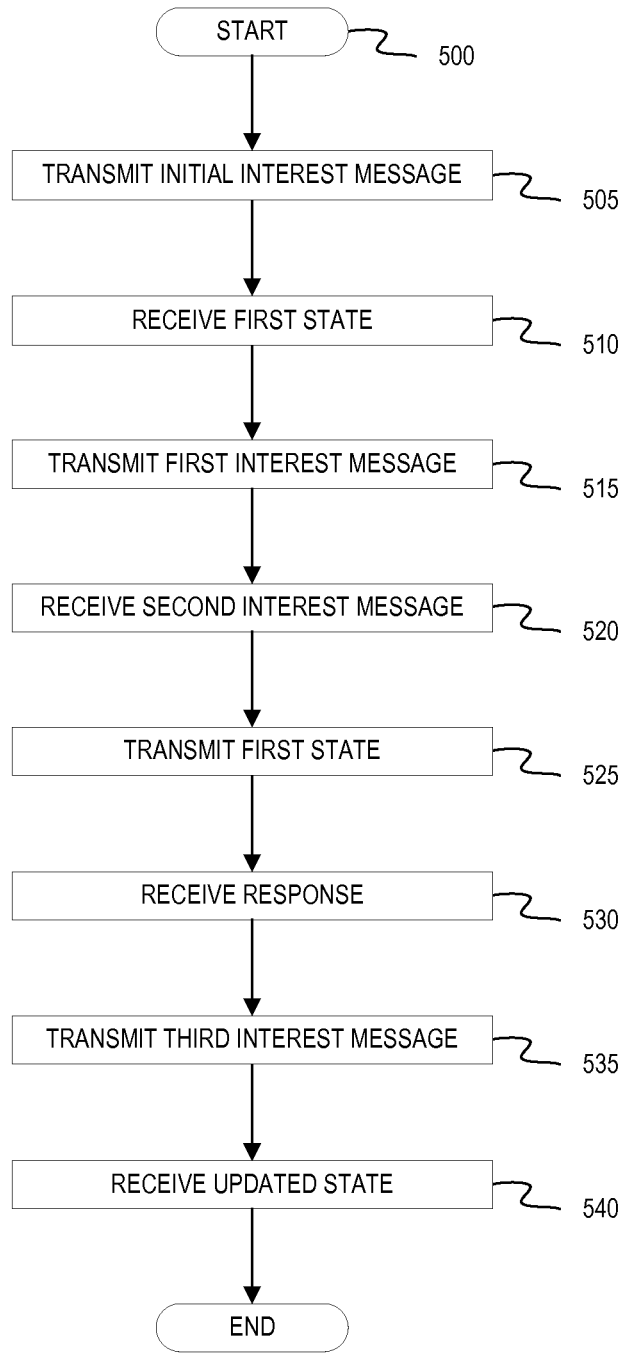
FIG. 5 is a flowchart representation of a method of requesting a REST operation, in accordance with some embodiments.

FIG. 5 is a flowchart representation of a method 500 of requesting a REST operation, in accordance with some embodiments. In some implementations, the method 500 may be performed by a client device and/or a client module (e.g., client device 130 and/or client module 131 illustrated in FIGS. 1 and 2). Briefly, method 500 includes transmitting a request for and receiving an initial state, transmitting a request for a server to perform the REST operation, and receiving the response to the request. The method 500 begins at block 505 where the method 500 transmits an initial interest message to request a first state (e.g., a client state) for a client device and/or client module. For example, the client device may request the first state to use for subsequent REST operations (as discussed above). At block 510, the method 500 receives the first state. For example, the client device may receive the first state from the server (as discussed above). In one embodiment, blocks 505 and 510 may be optional (e.g., may not be performed). For example, the first state may have already been received by the client device and the method 500 may not perform blocks 505 and 510.

At block 515, the method 500 may transmit a first interest message to request a REST operation from the server (e.g., to request the server to perform the REST operation). For example, the method 500 may transmit the first interest message to the server (as discussed above). The first interest message may include a name that identifies the server/server module and/or identifies the requested REST operation (as discussed above). The first message may also include a second name (e.g., a non-routable name or a reflexive name) that identifies the first state (e.g., the client state) that the client device is willing to provide to the server. The method 500 receives a second interest message that includes the second name at block 520. For example, the method 500 may receive the second interest message requesting the first state from the server. The method 500 transmits the first state to the server at block 525. At block 530, the method 500 receives a response to the request for the REST operation. As discussed above, the response may include a result of the request (e.g., may indicate whether the REST operation failed or was performed successfully).

In one embodiment, the response may also indicate that an updated state is available as a result of the REST operation. For example, the response may indicate that the REST operation updated (e.g., modified and/or changed) the first state. The method 500 may transmit a third interest message to request the updated state at block 535. For example, the method 500 may transmit a third interest message that includes the name of the client state. At block 540, the method 500 may receive the updated state from the server. As discussed above, the updated state may be signed and optionally encrypted by the server (e.g., to protect the updated state from unauthorized access and/or to allow verification that the updated state has not been modified). In another embodiment, if the response does not indicate that an updated state is available, the method 500 may not perform blocks 535 and 540 (e.g., blocks 535 and 540 may be optional). In a further embodiment, the updated state may be included with the response received at block 530. For example, additional data objects may be received in addition to the response and the additional data objects may include the updated state. The blocks 535 and 540 may be optional when the updated state is included with the response.

Figure 6:
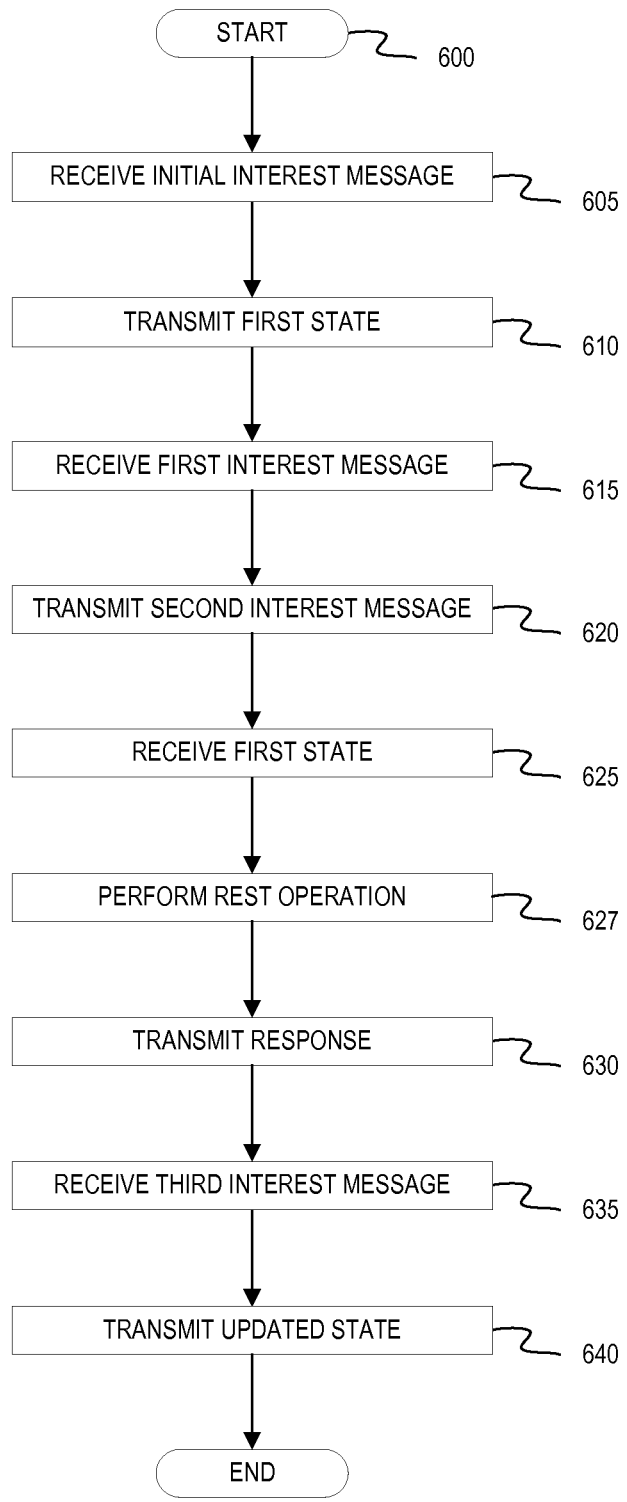
FIG. 6 is a flowchart representation of a method of performing a REST operation, in accordance with some embodiments.

FIG. 6 is a flowchart representation of a method 600 of performing a REST operation, in accordance with some embodiments. In some implementations, the method 600 may be performed by a server and/or a server module (e.g., server 110 and/or server module 111 illustrated in FIGS. 1 and 2). Briefly, method 600 includes receiving a request for and transmitting an initial state, receiving a request for a server to perform the REST operation, performing the REST operation, and transmitting a response to the request. The method 600 begins at block 605 where the method 600 receives an initial interest message to request a first state (e.g., a client state) from a client device (or client module). For example, the method may receive a request for the first state from the client device (as discussed above). At block 610, the method 600 transmits the first state to the client device. In one embodiment, blocks 605 and 610 may be optional (e.g., may not be performed). For example, the client device may already have the first state from a previous REST operation and the method 600 may not perform blocks 605 and 610.

At block 615, the method 600 may receive a first interest message to request a REST operation from the server (e.g., to request the server to perform the REST operation). For example, the method 600 may receive the first interest message from the client device (as discussed above). The first interest message may include a name that identifies the server/server module and/or identifies the requested REST operation (as discussed above). The first interest message may also include a second name (e.g., a non-routable name or a reflexive name) that identifies the first state (e.g., the client state) that the client device is willing to provide to the server. The method 600 transmits a second interest message that includes the second name at block 620. For example, the method 600 may transmit the second interest message to request the first state from the server. The method 600 receives the first state from the client device at block 625. At block 627, the method 600 performs the REST operation requested in the first interest message. For example, the method 600 may withdraw or transfer money from a user's checking account. At block 630, the method 600 transmits a response to the request for the REST operation. As discussed above, the response may include a result of the request (e.g., may indicate whether the REST operation failed or was performed successfully).

In one embodiment, the response may also indicate that an updated state is available as a result of the REST operation. For example, the response may indicate that the REST operation updated (e.g., modified and/or changed) the first state. The method 600 may receive a third interest message requesting the updated state at block 635. For example, the method 600 may receive a third interest message that includes the name of the client state. At block 640, the method 600 may transmit the updated state to the client device. As discussed above, the updated state may be signed and optionally encrypted at block 640 (e.g., to protect the updated state from unauthorized access and/or to allow verification that the updated state has not been modified). In another embodiment, if the response does not indicate that an updated state is available, blocks 635 and 640 may be optional. For example, the method 600 may not receive the third interest message (because no updated state is available) and blocks 635 and 640 may not be performed.

Figure 7:
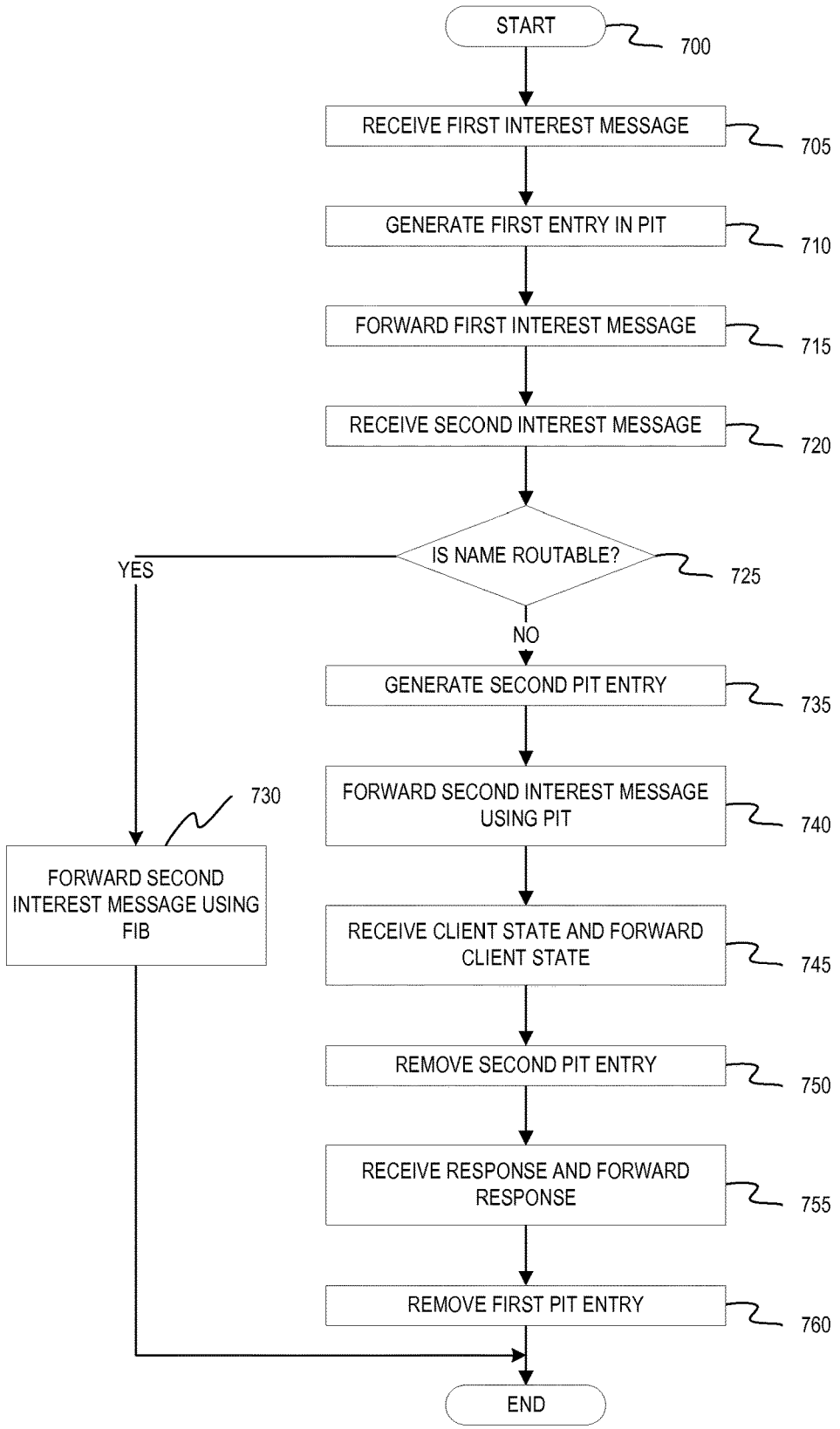
FIG. 7 is a flowchart representation of a method of forwarding interest objects and/or data objects, in accordance with some embodiments.

FIG. 7 is a flowchart representation of a method 700 of forwarding interest objects and/or data objects, in accordance with some embodiments. In some implementations, the method 700 may be performed by a router and/or router module (e.g., router 140 and/or router module 142 illustrated in FIGS. 1 and 2). Briefly, method 700 includes receiving interest messages, receiving data objects, generating PIT entries for the interest messages, and forwarding the interest messages and/or data objects. The method 700 begins at block 705 where the method 700 receives a first interest message requesting a REST operation from a server (e.g., requesting the server to perform the REST operation). For example, the method 700 may receive the first interest message from a client device (as discussed above). The first interest message may include a name that identifies the server/server module and/or identifies the requested REST operation (as discussed above). The first message may also include a second name (e.g., a non-routable name or a reflexive name) that identifies the first state (e.g., the client state) that the client device is willing to provide to the server. The method 700 generates a first PIT entry for the first interest message (as discussed above in conjunction with FIGS. 4A through 4D). The method 700 forwards the first interest message to the server at block 715. For example, the method 700 may use a FIB to forward the interest message to the server.

The method 700 receives a second interest message that includes the second name at block 720. The method 700 may determine whether the second interest message is addressed to a name that is non-routable (e.g., requests data with a non-routable name). For example, the method 700 may determine whether the second name has a keyword, prefix, value, etc., indicating that the second name is non-routable. In another example, the method 700 may determine whether the second interest message includes a field, value, header, etc., indicating that the second name is non-routable (e.g., indicating that the second interest message is a reflexive interest message). If the second interest is addressed to a routable name, the method 700 may forward the second interest message using the FIB at block 730. For example, the second interest message may be a standard interest message requesting a data object and the FIB may be used to forward the second interest message. If the second interest message is addressed to a non-routable name, the method 700 creates a second PIT entry and the timeout period for the second PIT entry may be less than or equal to the timeout period for the first PIT entry (as discussed above in conjunction with FIGS. 4A through 4D) at block 735. In one embodiment, the second PIT entry may be associated and/or linked to the first PIT entry. At block 740, the method 700 may forward the second interest message to the client device using the PIT. For example, the method 700 may forward the second interest message using the first entry in the PIT (as discussed above in conjunction with FIGS. 4A through 4D).

The method 700 may receive the client state from the client device and may forward the client state to the server at block 745. The method 700 may use the second entry in the PIT to forward the client state to the server (as discussed above in conjunction with FIGS. 4A through 4D). At block 750, the method may remove the second entry from the PIT after forwarding the client state to the server (as discussed above in conjunction with FIGS. 4A through 4D). The method 700 may receive a response to the request for the REST operation from the server and may forward the response to the client at block 755. At block 760, the method 700 removes the first entry from the PIT after forwarding the response to the client device (as discussed above in conjunction with FIGS. 4A through 4D).

Figure 8:
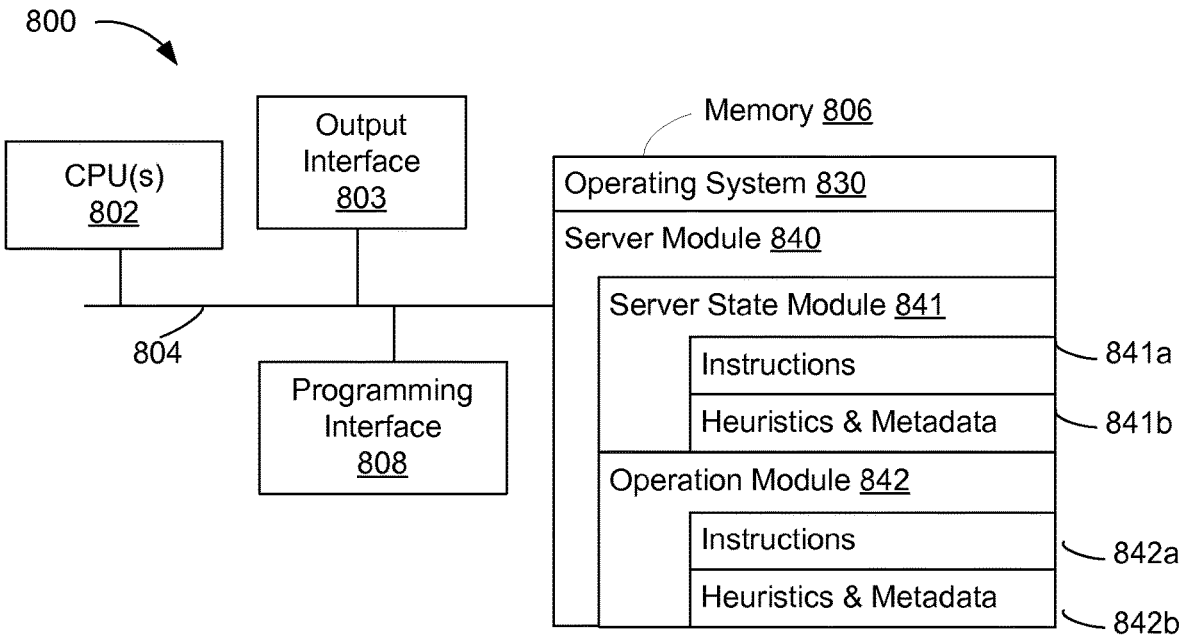
FIG. 8 is a block diagram of a computing device, in accordance with some embodiments.

FIG. 8 is a block diagram of a computing device 800, in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 800 includes one or more processing units (CPU's) 802 (e.g., processors), one or more output interfaces 803, a memory 806, a programming interface 808, and one or more communication buses 804 for interconnecting these and various other components.

In some embodiments, the communication buses 804 include circuitry that interconnects and controls communications between system components. The memory 806 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 806 optionally includes one or more storage devices remotely located from the CPU(s) 802. The memory 806 comprises a non-transitory computer readable storage medium. Moreover, in some embodiments, the memory 806 or the non-transitory computer readable storage medium of the memory 806 stores the following programs, modules and data structures, or a subset thereof including an optional operating system 830 and a server module 840. In some embodiment, one or more instructions are included in a combination of logic and non-transitory memory. The operating system 830 includes procedures for handling various basic system services and for performing hardware dependent tasks. In some embodiments, the server module 840 may be configured to receive requests to perform REST operations, perform REST operations, transmit client states, and request client states. To that end, the server module 840 includes a server state module 841 and an operation module 842.

In some embodiments, the server state module 841 may receive a request for a client state from a client device and may transmit the client state to the client device. The server state module 841 may also be configured to request the client state for the client device. To that end, the server state module 841 includes a set of instructions 841a and heuristics and metadata 841b. In some embodiments, the operation module 842 may receive a request to perform a REST operation and may perform the REST operation. The operation module 842 may also be configured to transmit a response to the request to the client device. To that end, the operation module 842 includes a set of instructions 842a and heuristics and metadata 842b.

Although the server module 840, the server state module 841, and the operation module 842 are illustrated as residing on a single computing device 800, it should be understood that in other embodiments, any combination of the server module 840, the server state module 841, and the operation module 842 may reside on a separate computing device.

Figure 9:
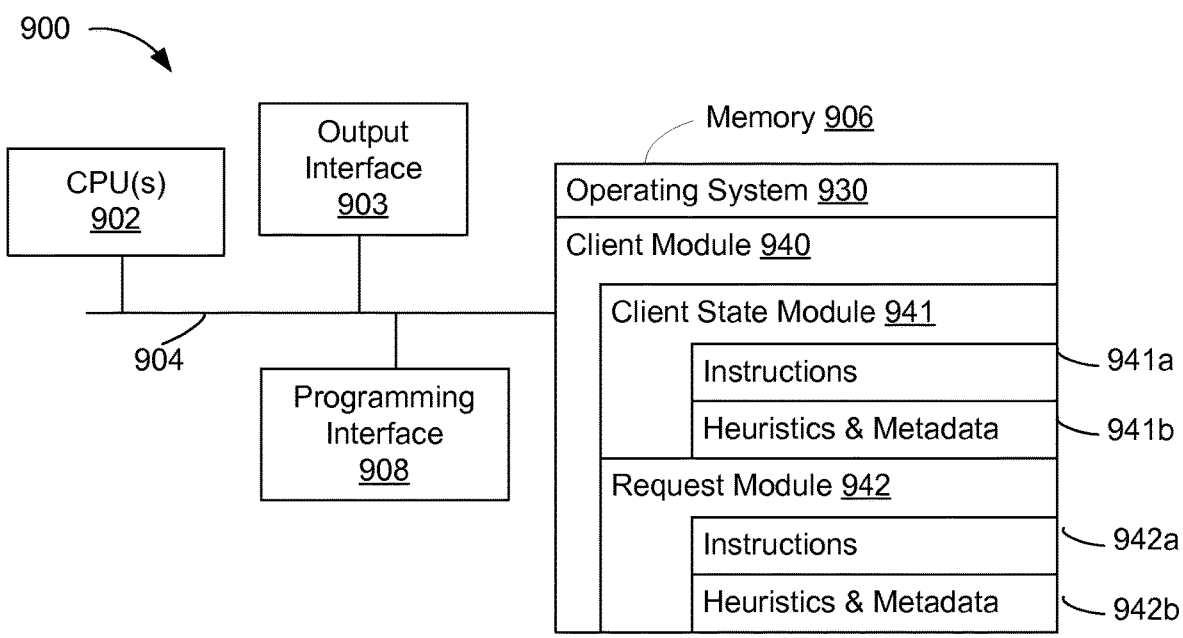
FIG. 9 is a block diagram of a computing device, in accordance with some embodiments.

FIG. 9 is a block diagram of the computing device 900 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 900 includes one or more processing units (CPU's) 902 (e.g., processors), one or more output interfaces 903, a memory 906, a programming interface 908, and one or more communication buses 904 for interconnecting these and various other components.

In some embodiments, the communication buses 904 include circuitry that interconnects and controls communications between system components. The memory 906 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 906 optionally includes one or more storage devices remotely located from the CPU(s) 902. The memory 906 comprises a non-transitory computer readable storage medium. Moreover, in some embodiments, the memory 906 or the non-transitory computer readable storage medium of the memory 906 stores the following programs, modules and data structures, or a subset thereof including an optional operating system 930 and a link module 940. In some embodiment, one or more instructions are included in a combination of logic and non-transitory memory. The operating system 930 includes procedures for handling various basic system services and for performing hardware dependent tasks. In some embodiments, the client module 940 may be configured to transmit requests to perform REST operations, transmit client states, and request client states. To that end, the client module 940 includes a client state module 941 and a request module 942.

In some embodiments, the client state module 941 may receive a request for a client state from a server and may transmit the client state to the server. The client state module 941 may also be configured to request an updated client state from the server. To that end, the client state module 941 includes a set of instructions 941*a* and heuristics and metadata 941*b*. In some embodiments, the request module 942 may be configured to transmit a request to perform a REST operation to a server. The request module 942 may also be configured to receive a response to the request to from the server. To that end, the request module 942 includes a set of instructions 942*a* and heuristics and metadata 942*b*.

Although the client module 940, the client state module 941, and the request module 942 are illustrated as residing on a single computing device 900, it should be understood that in other embodiments, any combination of the client module 940, the client state module 941, and the request module 942 may reside on separate computing devices. For example, each of the server module, the server state module 841, and the operation module 842 may reside on a separate computing device.

Figure 10:
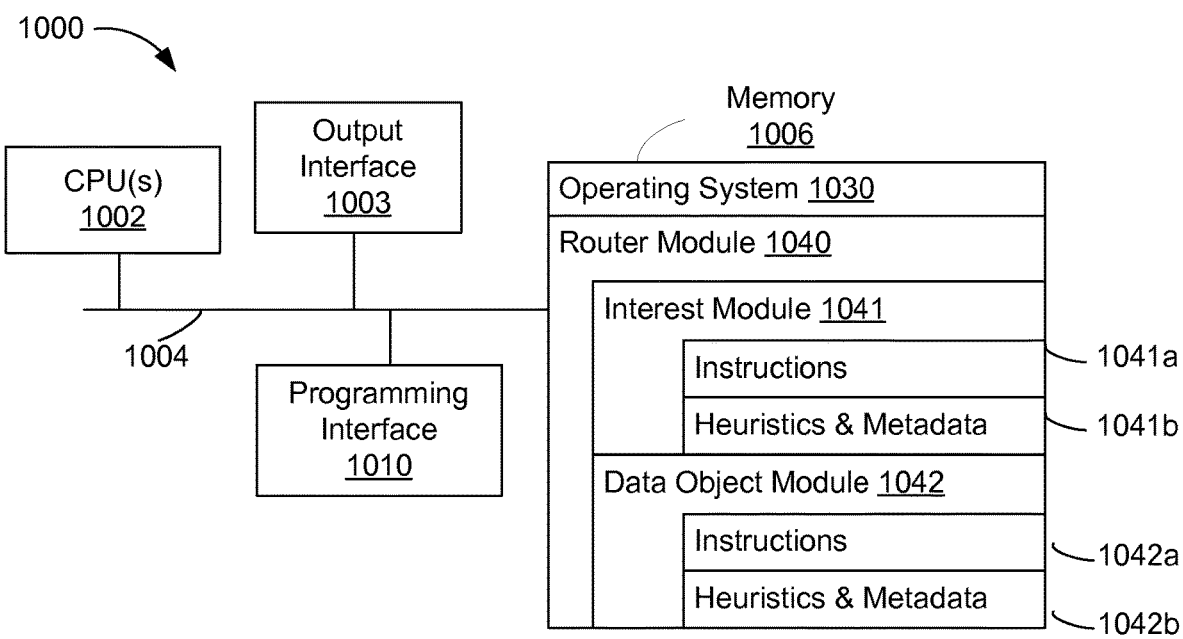
FIG. 10 is a block diagram of a computing device, in accordance with some embodiments.

FIG. 10 is a block diagram of the computing device 1000 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 1000 includes one or more processing units (CPU's) 1002 (e.g., processors), one or more output interfaces 1003, a memory 1006, a programming interface 1008, and one or more communication buses 1004 for interconnecting these and various other components.

In some embodiments, the communication buses 1004 include circuitry that interconnects and controls communications between system components. The memory 1006 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 1006 optionally includes one or more storage devices remotely located from the CPU(s) 1002. The memory 1006 comprises a non-transitory computer readable storage medium. Moreover, in some embodiments, the memory 1006 or the non-transitory computer readable storage medium of the memory 1006 stores the following programs, modules and data structures, or a subset thereof including an optional operating system 1030 and a router module 1040. In some embodiment, one or more instructions are included in a combination of logic and non-transitory memory. The operating system 1030 includes procedures for handling various basic system services and for performing hardware dependent tasks. In some embodiments, the router module 1040 may be configured to forward interest messages, forward data objects, and maintain a FIB and a PIT. To that end, the router module 1040 includes an interest module 1041 and a data object module 1042.

In some embodiments, the interest module 1041 is configured to receive interest messages and forward the interest message using a FIB or PIT. To that end, the interest module 1041 includes a set of instructions 1041*a* and heuristics and metadata 1041*b*. In some embodiments, the data object module 1042 is configured to receive data objects (e.g., client states, responses, etc.) and forward the data objects using a FIB or PIT. To that end, the data object module 1042 includes a set of instructions 1042*a* and heuristics and metadata 1042*b*.

Although the router module 1040, the interest module 1041, and the data object module 1042 are illustrated as residing on a single computing device 1000, it should be understood that in other embodiments, any combination of the router module 1040, the interest module 1041, and the data object module 1042 may reside on separate computing devices. For example, each of the router module 1040, the interest module 1041, and the data object module 1042 may reside on a separate computing device.

Moreover, FIGS. 8 through 10 are intended more as functional description of the various features which may be present in a particular embodiment as opposed to a structural schematic of the embodiments described herein. As recognized by those of ordinary skill in the art, items shown separately could be combined and some items could be separated. For example, some functional modules shown separately in FIGS. 8 through 10 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional subcomponents to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some aspects of the systems and methods described herein can advantageously be implemented using, for example, computer software, hardware, firmware, or any combination of computer software, hardware, and firmware. Computer software can comprise computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that can be implemented using software to be executed on a general purpose computer can also be implemented using a different combination of hardware, software, or firmware. For example, such a module can be implemented completely in hardware using a combination of integrated circuits. Alternatively or additionally, such a feature or function can be implemented completely or partially using specialized computers designed to perform the particular functions described herein rather than by general purpose computers.

Multiple distributed computing devices can be substituted for any one computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that can direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact. Also as used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

Further as used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method, comprising:
at a client device configured for communications in an information centric networking (ICN) system:
transmitting, from the client device to a server, a first interest message, wherein the first interest message includes a request for a representational state transfer (REST) operation, a first name of a first state for the REST operation, and one or more additional names;
receiving, at the client device from the server, a second interest message, wherein the second interest message includes the first name of the first state for the REST operation;
transmitting, from the client device to the server by way of a router and responsive to receiving the second interest message, a first named data object indicated by the first name and a plurality of named data objects based on the first name and the one or more additional names, the first named data object including the first state for the REST operation, wherein, when the first data object is stored within a cache of the router, the router is configured to update interest messages indicating that the first data object is stored within the cache of the router, further wherein each named data object of the plurality of named data objects comprises a portion of the first state; and
receiving, at the client device from the server, a response to the REST operation indicating whether the REST operation was completed successfully to update the first state.

2. The method of claim 1, further comprising:
transmitting, to the server, an initial interest message including the first name of the first state for the REST operation; and
receiving, from the server, the first state.

3. The method of claim 1, wherein the first named data object includes one or more of a Named Data Networking (NDN) data object or a Content Centric Networking (CCN) data object.

4. The method of claim 1, wherein the REST-operation includes a second name, and wherein the second name identifies the REST operation.

5. The method of claim 1, wherein the response includes comprises a result of the REST operation.

6. The method of claim 1, wherein the response includes data indicating that the updated first state is available.

7. The method of claim 6, further comprising:
transmitting, to the server, a third interest message, wherein the third interest message includes a second name for the updated first state; and
receiving, from the server responsive to transmitting the third interest message, a second named data object including the updated first state.

8. The method of claim 1, wherein the first name includes a non-routable name.

9. The method of claim 1, wherein the first name enables the server to request the first state when the first state is used for the REST operation.

10. A method, comprising:
at a server configured for communications in an information centric networking (ICN) system:
receiving, at the server from a client device, a first interest message, wherein the first interest message includes a request for a representational state transfer (REST) operation, a first name of a first state for the REST operation, and one or more additional names;
transmitting, from the server to the client device, a second interest message, wherein the second interest message includes the first name of the first state for the REST operation;
receiving, at the server from the client device by way of a router and responsive to transmitting the second interest message, a first named data object indicated by the first name and a plurality of named data objects based on the first name and the one or more additional names, the first named data object including the first state for the REST operation, wherein, when the first data object is stored within a cache of the router, the router is configured to update interest messages indicating that the first data object is stored within the cache of the router, further wherein each named data object of the plurality of named data objects comprises a portion of the first state; and
transmitting, from the server to the client device, a response to the REST operation indicating whether the REST operation was completed successfully to update the first state.

11. The method of claim 10, further comprising:
receiving, from the client device, an initial interest message including the first name of the first state for the REST operation; and
transmitting, to the client device, the first state.

12. The method of claim 10, wherein the first named data object includes one or more of a Named Data Networking (NDN) data object or a Content Centric Networking (CCN) data object.

13. The method of claim 10, wherein the REST operation includes a second name, and wherein the second name identifies the REST operation.

14. The method of claim 10, further comprising:
performing the REST operation based on the first state.

15. The method of claim 10, wherein the response includes a result of the REST operation.

16. The method of claim 10, wherein the response includes data indicating that the updated first state is available.

17. The method of claim 16, further comprising:
receiving, from the client device, a third interest message, wherein the third interest message includes a second name for the updated first state; and
transmitting, to the client device responsive to receiving the third interest message, a second named data object including the updated first state.

18. The method of claim 10, wherein the first name includes a non-routable name.

19. The method of claim 10, wherein the first name enables the first state to be requested when the first state is used for the REST operation.

20. The method of claim 14, wherein performing the REST operation based on the first state modifies the first state to the updated first state.

21. The method of claim 20, wherein the response includes the updated first state.

22. The method of claim 20, wherein the response indicates that the first state has been modified.

23. The method of claim 22, further comprising:
receiving, from the client device, a third interest message, wherein the third interest message includes a second name for the updated first state; and
transmitting, to the client device responsive to receiving the third interest message, a second named data object including the updated first state.

24. The method of claim 10, wherein the response indicates a reason why the REST operation was not completed successfully.

25. The method of claim 1, wherein the response indicates a reason why the REST operation was not completed successfully.

* * * * *